(12) United States Patent
Held et al.

(10) Patent No.: US 7,001,520 B2
(45) Date of Patent: *Feb. 21, 2006

(54) METHOD FOR TREATING WASTE-ACTIVATED SLUDGE USING ELECROPORATION

(75) Inventors: Jeffrey Held, Chicago, IL (US); Satya P. Chauhan, Columbus, OH (US)

(73) Assignee: Opencel LLC., Highland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/795,944

(22) Filed: Mar. 8, 2004

(65) Prior Publication Data

US 2004/0168977 A1    Sep. 2, 2004

Related U.S. Application Data

(63) Continuation of application No. 10/270,420, filed on Oct. 15, 2002, now Pat. No. 6,709,594, which is a continuation-in-part of application No. 10/107,614, filed on Mar. 26, 2002, now Pat. No. 6,540,919, which is a continuation of application No. 09/612,776, filed on Jul. 10, 2000, now Pat. No. 6,395,176, which is a continuation-in-part of application No. 09/468,427, filed on Dec. 21, 1999, now abandoned, which is a continuation of application No. 09/229,279, filed on Jan. 13, 1999, now Pat. No. 6,030,538, which is a continuation-in-part of application No. 08/934,548, filed on Sep. 22, 1997, now Pat. No. 5,893,979, which is a continuation-in-part of application No. 08/552,226, filed on Nov. 1, 1995, now Pat. No. 5,695,650.

(51) Int. Cl.
*C02F 1/461* (2006.01)

(52) U.S. Cl. ............... 210/609; 205/751; 210/610; 210/624; 210/626; 210/748; 422/22

(58) Field of Classification Search ................ 210/606, 210/609, 610, 622, 624, 625, 626, 748, 764, 210/768, 808; 205/751; 422/22
See application file for complete search history.

(56) References Cited

U.S. PATENT DOCUMENTS

| | | | |
|---|---|---|---|
| 980,463 | A | 1/1911 | Welcome |
| 3,265,605 | A | 8/1966 | Doevenspeck |
| 3,280,982 | A | 10/1966 | Barto |
| 3,397,140 | A | 8/1968 | Dea |
| 3,670,891 | A | 6/1972 | Allen |
| 3,699,906 | A | 10/1972 | Gallo |
| 3,913,500 | A * | 10/1975 | Paccione et al. ............ 110/224 |

(Continued)

FOREIGN PATENT DOCUMENTS

DE    4 101 076    8/1991

(Continued)

OTHER PUBLICATIONS

Gaudy, et al., "The Microbiology of Waste Disposal", *The Microbiology of Waste Waters*, W.B. Saundars & Comp., chapter 36, 1971.

(Continued)

*Primary Examiner*—Peter A. Hruskoci
(74) *Attorney, Agent, or Firm*—Marshall, Gerstein & Borun LLP

(57) ABSTRACT

A method of treating of municipal sludge, paper-pulp sludge, animal and plant waste, and the like, whereby the treatment thereof via electroporation causes the breakdown of waste activated sludge, which is then recycled back to a bioreactor, or to one or more additional bioreactors such as aerobic, facultative, anoxic, or strictly anaerobic.

13 Claims, 1 Drawing Sheet

GENERIC PROCESS FOR PEF TREATMENT OF BIOLOGICAL WASTEWATER TREATMENT SLUDGES

U.S. PATENT DOCUMENTS

| | | | |
|---|---|---|---|
| 3,962,069 A | 6/1976 | Inoue et al. | |
| 4,013,552 A | 3/1977 | Kreuter | |
| 4,043,047 A | 8/1977 | Galliker | |
| 4,101,400 A | 7/1978 | Pepping | |
| 4,193,206 A | 3/1980 | Maffet | |
| 4,306,978 A | 12/1981 | Wurtz | |
| 4,367,132 A | 1/1983 | Bell et al. | |
| 4,561,953 A | 12/1985 | Muralidhara et al. | |
| 4,592,291 A | 6/1986 | Sullivan, III | 110/346 |
| 4,608,179 A | 8/1986 | Deal | |
| 4,620,493 A | 11/1986 | Carlson | |
| 4,631,133 A | 12/1986 | Axelrod | 210/739 |
| 4,655,932 A | 4/1987 | Roslonski | |
| 4,671,874 A | 6/1987 | Fremont et al. | |
| 4,747,920 A | 5/1988 | Muralidhara et al. | |
| 4,755,305 A | 7/1988 | Fremont et al. | |
| 4,861,496 A | 8/1989 | Diaz | |
| 4,917,785 A | 4/1990 | Juvan | 204/164 |
| 4,957,606 A | 9/1990 | Juvan | 204/164 |
| 4,971,705 A | 11/1990 | Roslonski | |
| 5,026,484 A | 6/1991 | Juvan | |
| 5,034,111 A | 7/1991 | Kondo et al. | |
| 5,037,524 A | 8/1991 | Juvan | 204/660 |
| 5,037,560 A | 8/1991 | Gayman | |
| 5,048,404 A | 9/1991 | Bushnell et al. | |
| 5,049,248 A | 9/1991 | Muralidhara et al. | |
| 5,091,079 A | 2/1992 | Gayman | 210/175 |
| 5,143,626 A | 9/1992 | Nugent | |
| 5,230,809 A | 7/1993 | Roslonski | |
| 5,326,530 A | 7/1994 | Bridges | |
| 5,464,513 A | 11/1995 | Goriachev | 204/164 |
| 5,507,927 A | 4/1996 | Emery | 204/157.43 |
| 5,522,553 A | 6/1996 | LeClair et al. | 241/21 |
| 5,630,915 A | 5/1997 | Greene et al. | 204/164 |
| 5,690,978 A | 11/1997 | Yin et al. | |
| 5,695,650 A * | 12/1997 | Held | 210/748 |
| 5,801,489 A | 9/1998 | Chism, Jr. et al. | 315/111.21 |
| 5,846,425 A * | 12/1998 | Whiteman | 210/606 |
| 5,893,979 A * | 4/1999 | Held | 210/748 |
| 5,965,093 A * | 10/1999 | Adams | 422/186.04 |
| 6,030,538 A * | 2/2000 | Held | 210/748 |
| 6,395,176 B1 * | 5/2002 | Held et al. | 210/610 |
| 6,402,065 B1 | 6/2002 | Higgins | 241/21 |
| 6,491,820 B1 * | 12/2002 | Held et al. | 210/609 |
| 6,540,919 B1 * | 4/2003 | Held et al. | 210/609 |
| 6,709,594 B1 * | 3/2004 | Held et al. | 210/609 |

FOREIGN PATENT DOCUMENTS

| | | |
|---|---|---|
| DE | 4101076 | 8/1991 |
| FR | 2327965 | 6/1977 |
| JP | 53-91468 | 11/1978 |
| JP | 60-25597 | 8/1985 |
| JP | 1-210100 | 8/1989 |
| JP | 1210100 | 8/1989 |
| JP | 1-307500 | 12/1989 |
| JP | 1307500 | 12/1989 |
| WO | WO98/58740 | 12/1998 |
| WO | WO 99/24372 | 5/1999 |
| WO | WO 02/04356 | 1/2001 |

OTHER PUBLICATIONS

Curtiss, "Bacterial Cell Wall," Microbiology, W.W. Norton & Co., 1976.

Morrlsey et al., Sterilization Methods Used in Microbiology, *Sterilization Technology*, 1993.

Gupta, R.P., "Pulsed High Electric Field Sterilization".

"Controlling Fluid Flow with Porous Metals", Machine Design, Jan. 8, 1987.

Newmet-Thermet Krebsoge Company, "Porous Metal Products" products brochure.

Graham Mfg. Co., "Heliflow Heat Exchanger".

"Marlen OPTT Series Pump/Stuffer" product brochure.

Chauhan, S., "Feasability of Biosludge Dewatering Using Pulsed Electric Fields," Battelle Final Report, 1-24 (1998).

International Search Report (counterpart to priority application).

Bradley et al., *Bipolar Electrodeposition on Nanotubes* (USA).

Castro et al., *Microbial Inactivation of Foods by Pulsed Electric Fields*, J. Food Proc. Pres. 17:47-73 (1993) (USA).

*Consideration of Sludge Dewatering Methods* in The Microbiology of Waste Waters (W.B. Sauders & Co.) pp. 6-8, 17 (1971) (USA).

Dossenbach et al., *Pulse Current Electrodeposition of Palladium Silver Alloys* in AESF (American Electroplaters and Surface Finishers Society) Third International Pulse Plating Symposium H1-H3 (1986) (USA).

El-Shazly et al., *High-Speed Metal Deposition Using Interrupted Current Techniques* in AESF (American Electroplaters and Surface Finishers Society) Third International Pulse Plating Symposium C1-C7, C9-C11 (1986) (USA).

*Method Improves Sludge Digestion*, Waste Treatment Tech. News v. 12 i8 (1996) (USA).

Gutierrez, *Recent Advances in Pulse Plating Power Supply Technology & Plating Capability*, AESF 5th Pulse Plating Symposium 1-23 (Jun. 2000) (USA).

Kady International materials—4 pages (circa 1999) (USA).

Kady Internation materials—2 pages (circa 1999) (USA).

Koelzer, *Back to the Basics: Pulse Math*, Plating & Surface Finishing (Dec. 2000) (USA).

Mertens et al., *Developments of Nonthermal Processes for Food Preservation*, Food Tech. 46(5):124, 126-133 (May 1992) (USA).

Milad et al., *PPR Plating for HDI*, PC Fab, 40, 42, 44, 46 (2000) (USA).

Peshkovsky et al., *Dipolar Interactions in Molecules Aligned by Strong AC Electric Fields*, J. Magnetic Resonance, 147:104-109 (2000) (USA).

Puippe, *Influence of Charge and Discharge of Electrical Double Layer in Pulse Plating* in Theory and Practice of Pulse Plating (Americal Electroplaters and Surface Finishers Society), ch. 4, pp. 41-43 (1986) (USA).

Puippe, *Qualitative Approach to Pulse Plating* in Theory and Practice of Pulse Plating (Americal Electroplaters and Surface Finishers Society), ch. 1, pp. 1-3 (1986) (USA).

U.S. Food and Drug Administration, *Kinetics of Microbial Inactivation for Alternative Food Processing Technologies—Pulsed Electric Fields* (Jun. 2000) (USA).

Wadehra et al, *Reduced Wasting from Activated Sludge Processes Using a Mechanical Cell Lysis Technology* in WEFTEC 1999, (1999) (USA).

Zhang, Q. H., Monsalve-Gonzalez, A., Barbosa-Cánovas, G. V. and Swanson, B. G., *Inactivation of E. coli and S. cerevisiae by pulsed electric fields under controlled temperature conditions*, Transactions of the ASAE. 37(2): 581-587 (1994) (USA).

Zhang, Q. H., Chang, F.-J. and Barbosa-Cánovas, G. V., *Inactivation of microorganisms in a semisolid model food using high voltage pulsed electric fields*, Lebensm Wiss Technol. 27(6):538-543 (1994) (believed to be Germany).

Zhang, Q. H., Qin, B.-L., Barbosa-Cánovas, G. V. and Swanson, B. G, *Inactivation of E. coli for food pasteurization by high-strength pulsed electric fields*, J. Food Process Preserv. 19(2):103-118 (1995) (USA).

Zhang, Q. H., Barbosa-Cánovas, G. V. and Swanson, B. G., *Engineering aspects of pulsed electric field pasteurization*, J. Food Eng. 25(2):261-281 (1995) (Great Britain).

Zhang, Q. H., Qiu, X. and Sharma, S. K., *Recent development in pulsed electric field processing*. National Food Processors Association—New Technologies Yearbook. 31-46 (1997) (believed to be USA).

El-Shazly et al., *High-Speed Metal Deposition Using Interrupted Current Techniques* in AESF (American Electroplaters and Surface Finishers Society) Third International Pulse Plating Symposium C8 (1986) (USA).

Dentel et al., *Overview of Electrical Arc Conditioning of Biosolids* in Water Environment Reasearch Foundation: Workshop #116 Recent Advances in BioIsolids Research: Conditioning, Dewatering, and Beneficial Use 86-98 (1999) (USA).

* cited by examiner

GENERIC PROCESS FOR PEF TREATMENT OF BIOLOGICAL WASTEWATER TREATMENT SLUDGES

METHOD FOR TREATING WASTE-ACTIVATED SLUDGE USING ELECROPORATION

CROSS REFERENCE TO RELATED APPLICATION

This is a continuation of application Ser. No. 10/270,420, filed Oct. 15, 2002 now U.S. Pat. No. 6,709,594, which is a continuation-in-part of application Ser. No. 10/107,614, filed Mar. 26, 2002 now U.S. Pat. No. 6,540,919, which is incorporated by reference herein, which is a continuation of application Ser. No. 09/612,776 filed on Jul. 10, 2000, now U.S. Pat. No. 6,395,176, which is incorporated by reference herein, which is a continuation-in-part of application serial number Ser. No. 09/468,427, filed on Dec. 21, 1999, which is a continuation of application Ser. No. 09/229,279, filed on Jan. 13, 1999, now U.S. Pat. No. 6,030,538, which is incorporated by reference herein, which is a continuation-in-part of application Ser. No. 08/934,548, filed on Sep. 22, 1997, now U.S. Pat. No. 5,893,979, which is a continuation-in-part of application Ser. No. 08/552,226, filed on Nov. 1, 1995, now U.S. Pat. No. 5,695,650, which is incorporated by reference herein.

BACKGROUND OF THE INVENTION

In U.S. Pat. No. 6,030,538, issued in Feb. 29, 2000 entitled "Method and Apparatus for Dewatering Previously-Dewatered Municipal Waste-Water Sludges Using High Electrical Voltages", there is disclosed a system and method for dewatering and treating sludge emanating from municipal waste, or pulp-waste from a paper mill, as well as treating animal and plant waste. In that patent, the method for breaking down the sludge is to subject it to electroporation, which incorporates nonarcing, cyclical high voltages in the range of between 15 kv./cm and 100 kv./cm. which break down inter-cellular and intracellular molecular bonds of waste-activated sludge (WAS), to thus release inter-cellular and intracellular water, whereby the WAS is rendered inactive and greatly reduced in mass.

The viability and effectiveness of pulsed electric field (PEF) for disrupting the biomass in waste activated sludge (WAS) derived from municipal wastewater treatment has been proven in laboratory testing and on-site pilot projects. While there was no significant increase in the solids content of dewatered sludge, the quantity of WAS needing disposal was estimated to be significantly reduced. The pilot plant for testing at one or two wastewater treatment plants that generate WAS has been developed and deployed. A pulsed electric field (PEF) system that could handle 0.5 to 1.0 pgm WAS feed was designed. This requires an 8 kw power supply capable of generating 30 kV and pulse generator capable of handling 50 amp peak, current, bi-polar pulses, square wave, 10 μs pulse width, and 3000 pulses/second (pps).

SUMMARY OF THE INVENTION

It is the primary objective of the present to provide a treatment of municipal sludge, paper-pulp sludge, animal and plant waste, and the like, whereby the treatment thereof via electroporation causes the breakdown of waste activated sludge, which is then cycled either back to a previous bioreactor, and/or to one or more additional bioreactors, such as aerobic, facultative, anoxic, or strictly anaerobic.

BRIEF DESCRIPTION OF THE DRAWING

The invention will be more readily understood with reference to be accompanying drawing, wherein.

DETAILED DESCRIPTION OF THE INVENTION

Figure 1:
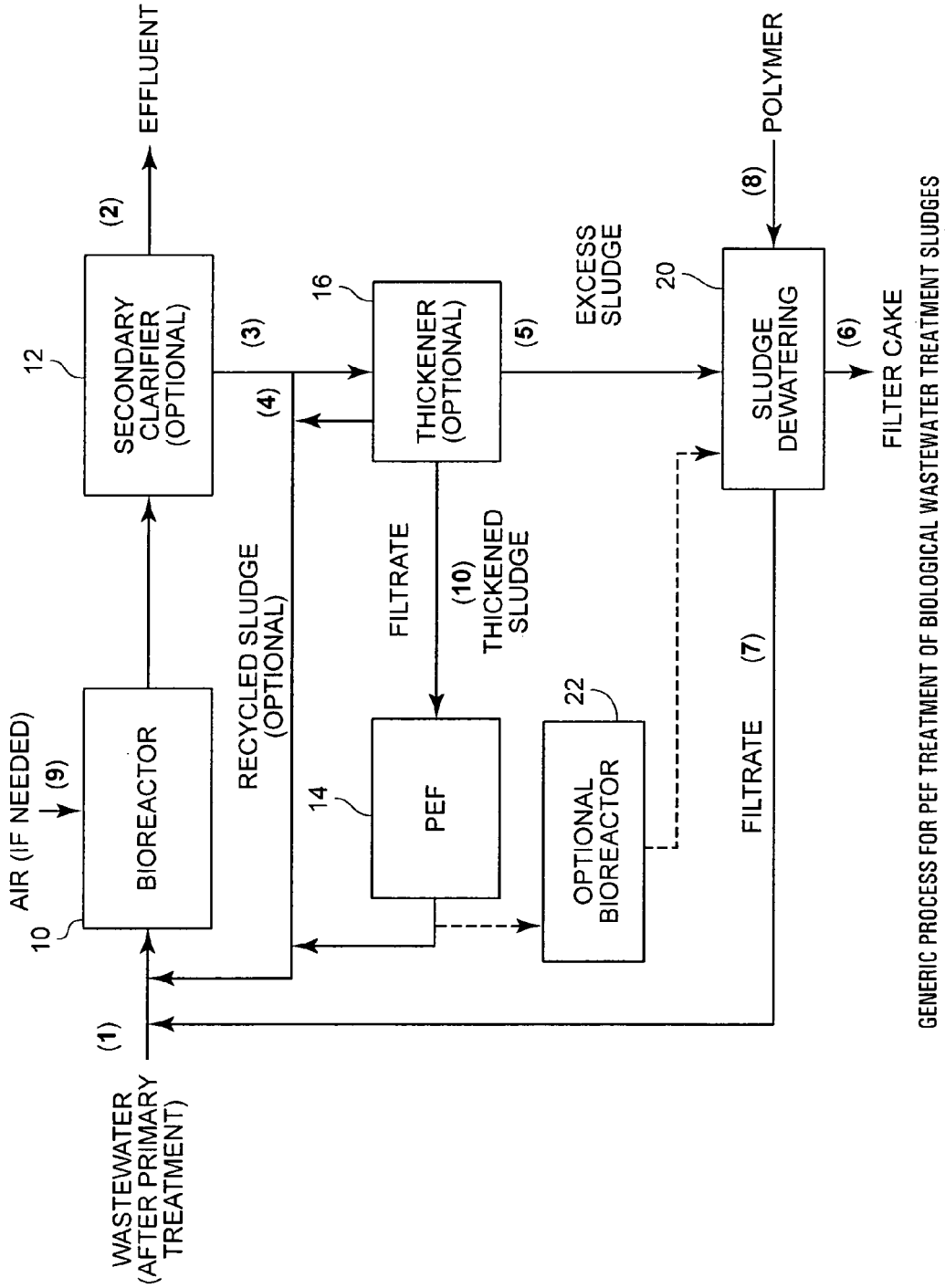
FIG. 1 is a schematic showing the process for electroporating sludge in order to break up and destroy the waste-activated sludge for transport to one or more bioreactors.

Referring to FIG. 1, there is shown the schematic for using the PEF-electroporation system as a secondary treatment for previously-dewatered sludge. In FIG. 1, the primary-treated wastewater is delivered to a bioreactor 10, which may or may not be provided with air depending upon the type of bioreactor used, as described hereinbelow. The bioreactor 10 may be aerobic, facultative, anoxic, or strictly anaerobic for performing biological digestion. From there the sludge maybe sent to an optional secondary clarifier 12, if necessary. From there, the sludge may be recycled directly back to the bioreactor 10. The sludge may be optionally thickened at thickener 16, with excess sludge being sent to a sludge dewatering unit 20 for further dewatering for forming a filter cake. From sludge dewatering unit 20, the filtrate is recycled back to the bioreactor 10. The filtrate exiting the bioreactor 10, either directly or through secondary clarifier 12 and thickener 16, is delivered to electroporating device 14, which provides a pulsed electric field (PEF) with voltages between 15 kv./cm. and 100 kv./cm., as disclosed in detail in the above-mentioned patents and applications. The cellular units of the waste-activated sludge (WAS) treated by the electroporation device 14 are broken up and destroyed, releasing intracellular and inter-cellular water, and organic solids-contents. The PEF process is applicable to biomass contained in biological sludges from all the types of secondary wastewater treatment bioreactors. The PEF process is effective because it lyses cells, and the resulting cells become more readily available as food when those treated cells are fed to a bioreactor.

The PEF-treated sludge is then delivered to one or more bioreactors. It may be recycled back to the bioreactor 10, to one or more optional bioreactors 22, or to both the bioreactor 10 and optional bioreactor or bioreactors 22. If delivered to optional bioreactor 22, the filtrate therefrom is transported to the sludge dewatering device 20.

The bioreactors, or biological cells, 10, 22 may be either strictly aerobic (requiring oxygen), facultative (able to function with or without oxygen), anoxic (low or no dissolved oxygen conditions), or strictly anaerobic (no dissolved oxygen). The fundamental structure of the cells is the same in all of these regimes for the purpose of PEF treatment and application. Each type of these microorganisms' cells are subject to electroporation, the development of holes in the cell wall due to the PEF electropulsing, and those cells become a food source when fed to the bioreactor. The bioreactor that receives the cells does not have to be the same type from which the microorganism cells have originated, but may be in any of these regimes, i.e., aerobic, anoxic, facultative, or anaerobic, as they may be used as food by microorganisms in any of these regimes. In addition, the PEF-treated cells may be chemotrophs or autotrophs, either or both of which are found in the different biological treatment systems. In all cases, the different types of biomass from the various bioreactors used in wastewater treatment can be treated with the PEF process, with similar electroporation of cells resulting.

While a specific embodiment of the invention has been shown and described, it is to be understood that numerous changes and modifications may be made therein without departing from the scope and spirit of the invention as set forth in the appended claims.

What is claimed is:

1. A method of treating sludge containing cellular units including intercellular water, intracellular water and organic solids, comprising:
   (a) directing the sludge to an electroporating system;
   (b) electroporating the sludge for destroying at least most of the cellular units contained therein by incorporating a nonarcing voltage and pulse width; and
   said (b) causing disruption of the cellular units, allowing for the release of intercellular water, intracellular water and organic solids; and
   (c) directing the electroporated sludge to a bioreactor for performing biological digestion thereon whereby the electroporated sludge is used as food.

2. The method according to claim 1, wherein (c) comprises delivering the electroporated sludge to at least one of: an aerobic, anoxic, facultative, or anaerobic bioreactor.

3. The method according to claim 1, further comprising, before (a):
   (d) transporting the sludge from a primary treatment apparatus to at least one bioreactor of a secondary treatment apparatus; and
   (e) said (c) comprising recycling the electroporated sludge back to said at least one bioreactor of (d).

4. The method according to claim 3, wherein (e) comprises delivering the destroyed cellular units of (b) to one of: an aerobic, anoxic, facultative, or anaerobic bioreactor.

5. The method according to claim 3, wherein said secondary treatment apparatus further comprises a sludge dewatering apparatus; said (c) further comprising:
   (f) delivering the destroyed cellular units of (b) to another bioreactor downstream from said at least one bioreactor and upstream of said sludge dewatering apparatus.

6. The method according to claim 5, wherein (c) comprises delivering the destroyed cellular units of (b) to one of: an aerobic, anoxic, facultative, or anaerobic bioreactor.

7. The method according to claim 1, further comprising, before said (a):
   (f) transporting the sludge from a primary treatment apparatus to a secondary treatment apparatus;
   said secondary treatment apparatus comprising a sludge dewatering apparatus; said (c) comprising delivering the destroyed cellular units of (b) to a bioreactor upstream of said sludge dewatering apparatus.

8. A method of treating sludge containing cellular units including intercellular water, intracellular water and organic solids, comprising:
   (a) delivering sludge to an electroporation system;
   (b) electroporating said sludge in said electroporation system by exposing said sludge to a pulsed electric field with a nonarcing voltage and pulse width to disrupt said cellular units and to release intercellular water, intracellular water and organic solids; and
   (c) delivering said electroporated sludge to at least one bioreactor for reaction therewith;
   said (c) comprising supplying said electroporated sludge as food for said at least one bioreactor.

9. The method according to claim 8, wherein (c) comprises delivering said electroporated sludge to at least one of: an aerobic, anoxic, facultative, or anaerobic bioreactor.

10. A method of treating sludge containing cellular units including intercellular water, intracellular water and organic solids, comprising:
    (a) delivering sludge to an electroporation system;
    (b) electroporating said sludge in said electroporation system by exposing said sludge to a pulsed electric field with a nonarcing voltage and pulse width to disrupt said cellular units and to release organic solids; and
    (c) supplying said released organic solids as food to a means for biologically digesting organic solids.

11. The method according to claim 10, wherein (c) comprises delivering the released organic solids to at least one of: an aerobic, anoxic, facultative, or anaerobic bioreactor.

12. The method according to claim 10, further comprising, before (a):
    (d) transporting said sludge from a primary treatment apparatus to at least one bioreactor of a secondary treatment apparatus; and
    (e) said (c) comprising recycling the released solids back to said at least one bioreactor of (d).

13. The method according to claim 12, wherein (e) comprises delivering the disrupted cellular units of (b) to one of: an aerobic, anoxic, facultative, or anaerobic bioreactor.

* * * * *

UNITED STATES PATENT AND TRADEMARK OFFICE
Certificate

Patent No. 7,001,520 B2                                                 Patented: February 21, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey Held, Chicago, IL (US); Satya P. Chauhan, Columbus, OH (US); and Anthony J. Tomasello, Chicago, IL (US).

Signed and Sealed this Fifteenth Day of April 2008.

DUANE S. SMITH
*Supervisory Patent Examiner*
Art Unit 1797

UNITED STATES PATENT AND TRADEMARK OFFICE
CERTIFICATE OF CORRECTION

PATENT NO. : 7,001,520 B2
APPLICATION NO. : 10/795944
DATED : February 21, 2007
INVENTOR(S) : Held et al.

It is certified that error appears in the above-identified patent and that said Letters Patent is hereby corrected as shown below:

On the title page item [75], insert:
Jeffrey Held, Chicago, IL (US): Satya P. Chauhan, Columbus, OH (US): Anthony J. Tomasello, Chicago, IL (US)

Signed and Sealed this

Ninth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,001,520 B2  Page 1 of 1
APPLICATION NO. : 10/795944
DATED : February 21, 2006
INVENTOR(S) : Held et al.

It is certified that error appears in the above-identified patent and that said Letters Patent is hereby corrected as shown below:

On the title page item [75], insert:
 Jeffrey Held, Chicago, IL (US): Satya P. Chauhan, Columbus, OH (US): Anthony J. Tomasello, Chicago, IL (US)

This certificate supersedes the Certificate of Correction issued September 9, 2008.

Signed and Sealed this

Thirtieth Day of September, 2008

JON W. DUDAS
*Director of the United States Patent and Trademark Office*